R. STECK.
ELECTRICAL SYSTEM.
APPLICATION FILED OCT. 26, 1920.
1,426,924.
Patented Aug. 22, 1922.
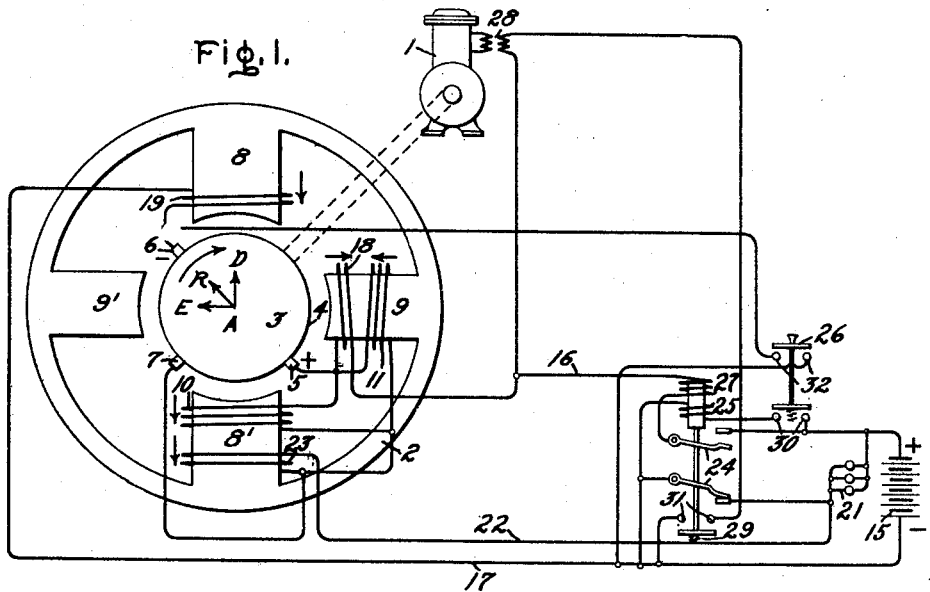
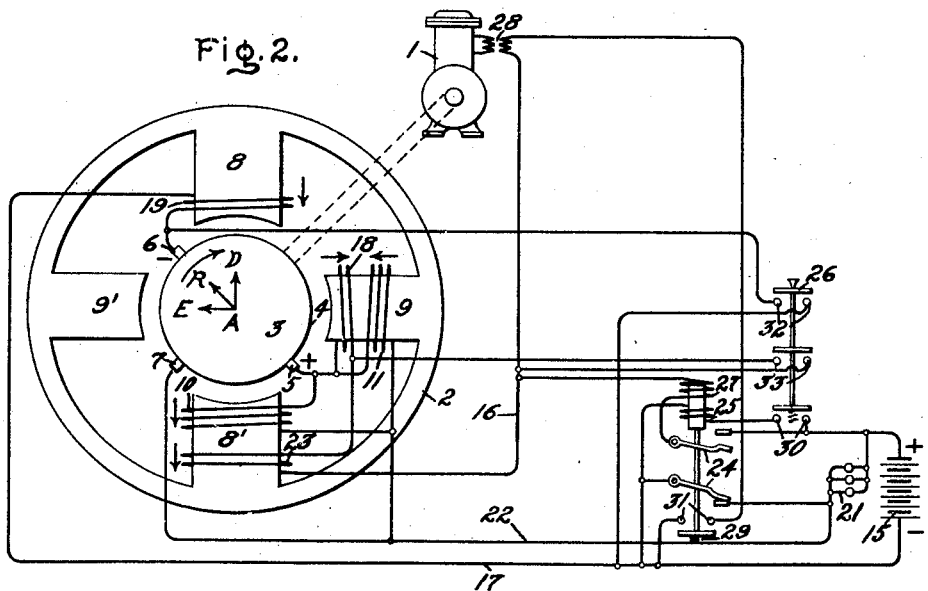
Inventor:
Robert Steck,
by Albert G. Davis
His Attorney.

UNITED STATES PATENT OFFICE.

ROBERT STECK, OF FORT WAYNE, INDIANA, ASSIGNOR TO GENERAL ELECTRIC COMPANY, A CORPORATION OF NEW YORK.

ELECTRICAL SYSTEM.

1,426,924.     Specification of Letters Patent.     Patented Aug. 22, 1922.

Application filed October 26, 1920. Serial No. 419,688.

*To all whom it may concern:*

Be it known that I, ROBERT STECK, a citizen of the United States, residing at Fort Wayne, county of Allen, State of Indiana, have invented certain new and useful Improvements in Electrical Systems, of which the following is a specification.

My invention relates to electrical systems and particularly to systems in which a plurality of translation circuits are supplied with electrical energy from a single dynamo electric machine.

My invention is an improvement on the electrical system shown in application, Serial No. 419,697, filed October 26, 1920, in the name of S. R. Bergman and assigned to the same assignee as this application. In the above-mentioned application there is disclosed an electrical system commonly known as a farm lighting system, which comprises a power and lighting circuit, a storage battery adapted to supply energy to said circuit, an internal combustion engine and a dynamo electric machine arranged to operate as a motor to crank the engine and to be driven by the engine to supply current to charge the battery and to supply current to the power and lighting circuit while the battery is being charged.

In the system as shown in the above-mentioned application it has been found that while the voltage impressed upon the power and lighting circuit remains substantially constant when this circuit only is loaded, there is a considerable drop in the voltage impressed upon the power and lighting circuit when a large charging current is being supplied to the battery and a relatively small load is connected to the power and lighting circuit. This drop in voltage is due to the fact that the total flux in the set of poles producing the voltage supplied to the power and lighting circuit is decreased by an amount corresponding to the component of the cross-magnetization in line with this set of poles.

One object of my invention is to provide in an electrical system of the type referred to an inherently regulated self-excited dynamo electric machine which will operate efficiently as a motor to crank the engine and as a generator to supply current to the battery and to the power and lighting circuit, the machine being so constructed and arranged that the voltage impressed upon the power and lighting circuit remains constant irrespective of the load upon this circuit and the amount of current being supplied to the battery, while the voltage impressed across the battery terminals varies so as to give the battery a suitable taper charge.

My invention will be better understood from the following description taken in connection with the accompanying drawings, and its scope will be pointed out in the appended claims.

Referring to the drawings, Fig. 1 illustrates one embodiment of my invention; and Fig. 2 represents a modification of the system shown in Fig. 1.

Referring to Fig. 1 of the drawings, 1 represents a prime mover such as any of the well known types of internal combustion engines connected to a dynamo electric machine 2 which is adapted to operate either as a motor or as a generator. This machine is provided with an armature 3 having a two-pole armature winding wound thereon and a commutator 4 on which bear the brushes 5 and 6 which are spaced 180 electrical degrees apart and a third brush 7 located between the 180 degree brushes, and a field magnet structure having two sets of mechanical field poles 8—8' and 9—9' surrounding the armature 3. It will be observed that the number of mechanical field poles is twice the number of poles of the armature winding, and this relation may be broadly expressed by saying that the machine has an $n$ pole armature and a field structure having $2n$ mechanical field poles. The mechanical field poles are arranged in two sets with an equal number of poles in each set and so that certain adjacent poles of the separate sets are of like polarity. In the arrangement shown, the poles 8—8' are excited by the exciting winding 10 which is connected to the brushes 5 and 7 and the field poles 9—9' are excited by the exciting winding 11 which is also connected across the brushes 5 and 7. These exciting windings are so arranged that the poles 8 and 9 and the poles 8' and 9' are of like polarity. In order to simplify the drawing the windings on each set of poles are shown on only one pole of the set, but in the actual machine, the windings are preferably equally distributed on all the poles of the set. The brushes 5, 6 and 7 and the sets of field poles 8—8' and 9—9' are so arranged with respect to each other that the voltage between the brushes 5 and 7 depends upon the flux in the set of poles 8—8' only, and the voltage between the 180 degree brushes 5 and 6 depends upon the flux in both sets of poles. Since the poles 8 and 9 and the poles 8' and 9' are of like polarity, the voltage between the brushes 5 and 6 is equal to the voltage between the brushes 5 and 7 plus the voltage between the brushes 6 and 7. The armature winding is so arranged that when the armature 3 is rotated in the direction indicated by the arrow, the brush 5 is the positive brush and the current flowing through the armature winding between brushes 5 and 6 produces a cross-magnetizing magnetomotive force AR which is substantially in line with the brushes 5 and 6 and which may be resolved into two components, AD which is in opposition to the magnetomotive force of the exciting winding 10 on the set of poles 8—8', and AE which is in the same direction as the magnetomotive force of the exciting winding 11 on the set of poles 9—9'. The current flowing through the armature winding between the brushes 5 and 7 only also produces a cross-magnetizing magnetomotive force in line with the component AE of the cross-magnetizing magnetomotive force AR.

The polar arc embraced by the set of poles 8—8' is considerably greater than that embraced by the set of poles 9—9' as the voltage required to be developed between the brushes 5 and 7 is considerably greater than that required to be developed between the brushes 6 and 7.

15 represents a storage battery which is adapted to be charged with current supplied through conductors 16 and 17 which are connected to the brushes 5 and 6 respectively. A field winding 18 on the set of poles 9—9' is connected in series with the conductor 16 and arranged to produce a magnetomotive force in said set of poles in opposition to the magnetomotive force of the exciting winding 11. A field winding 19 which is connected in series with the conductor 17 is provided on the set of poles 8—8' and arranged to produce a magnetomotive force therein in the same direction as the magnetomotive force of the exciting winding 10.

A power and lighting circuit 21 which requires a substantially constant voltage to be impressed thereon and which is shown as a lamp circuit, is connected so as to be supplied with current from the battery 15 when the battery is not being charged and to be supplied with current from the dynamo electric machine 2 through conductors 16 and 22 which are connected to the brushes 5 and 7 respectively, when the battery is being charged. A field winding 23 which is connected in series with the conductor 22 is provided on the set of poles 8—8' and arranged to produce therein a magnetomotive force in the same direction as the magnetomotive force of the exciting winding 10. Since the voltage generated between the brushes 5 and 6 is equal to the voltage between the brushes 5 and 7 plus the voltage between brushes 7 and 6, it will be evident that the voltage impressed upon the power and lighting circuit 21 is less than that impressed upon the battery 15.

Any suitable means may be provided for controlling the starting and stopping of the engine 1 and the connections between the battery 15, the power and lighting circuit 21 and the dynamo electric machine 2. The particular arrangement shown comprises an automatic switch 24 having a shunt winding 25, which is adapted to be connected across the battery 15 by contacts 30 of a manually operated starting switch 26, and a series winding 27 connected in series with the conductor 16. The switch 24 in its open position completes a circuit connecting the power and lighting circuit 21 directly across the battery 15. In the closed position of the automatic switch 24, this circuit is broken and the circuits between the brushes 5 and 7 and the power and lighting circuit 21 and between the brushes 5 and 6 and the battery 15 are completed. A circuit for the ignition coil 28 of the engine is also completed across the conductors 16 and 17 through contacts 31 when the switch 24 is closed. A spring 29 is provided to restore the switch to its open position when the windings 25 and 27 are deenergized. The starting switch 26 is arranged to complete a circuit through contacts 32 when in its closed position, thereby short circuiting the series field winding 19 for a purpose hereinafter described.

The operation of the system shown in Fig. 1 of the drawing is as follows:—

When the engine is idle, the apparatus occupies the position shown in the drawing and current is supplied from the battery 15 directly to the power and lighting circuit 21 through the contacts of the switch 24. When it is desired to run the machine 2 to supply current to charge the battery 15 the starting switch 26 is closed thereby allowing current to flow from the positive side of the battery 15 through contacts 30 and the shunt winding 25 of the automatic switch 24 to the negative side of the battery. Switch 24 thereupon closes and completes a circuit from the positive side of the battery 15 through the series winding 27 of the automatic switch 24, conductor 16, series field winding 18, brush 5, armature winding of the dynamo electric machine 2, brush 6, contacts 32 of the starting switches 26, conductor 17, to the negative side of the battery. Current also flows from the positive side of the battery to the positive brush 5 over the circuit above traced, and then through the exciting field windings 11 and 10 in multiple, brush 7, armature winding of the dynamo electric machine, brush 6, to the negative side of the battery. Current also flows from the positive side of the battery through the power and lighting circuit 21, conductor 22, series field winding 23, brush 7, to the negative side of the battery through the circuit above traced. Current also flows through the ignition coil 28, the circuit of which is connected across conductors 16 and 17 through contacts 31.

Since the series field winding 18 is wound so as to act differentially with the exciting winding 11 when the machine is acting as a generator, this winding acts accumulatively with the exciting winding 11 when the machine is acting as a motor. Since, however, the current through the series winding 19, while the machine is acting as a motor, would cause it to act differentially with the exciting winding 10, it is desirable to either short circuit, reverse, or change in any other suitable manner the connections of this series field winding so that the machine will have a large cranking torque when acting as a motor. In the arrangement illustrated I have shown the starting switch 26 as being arranged to complete through contacts 32 a short circuit around the winding 19 when the switch is in its closed position.

Also, since the current, if there is a load connected to the power and lighting circuit 21, flows through the series field winding 23 at this time in the same direction as when the machine is operating as a generator, this winding acts accumulatively with the exciting winding 10. Furthermore, the current through the armature winding produces at this time a cross-magnetizing magnetomotive force in line with the brushes 5 and 6 which is in the opposite direction to the cross-magnetizing magnetomotive force AR and this cross-magnetizing magnetomotive force may be resolved into two components, one which is in the opposite direction to the component AD and therefore in the same direction as the magnetomotive force of the exciting winding 10 on the set of poles 8—8′, and another component, which is in the opposite direction to the component AE and therefore in opposition to the magnetomotive force of the exciting winding 11 on the set of poles 9—9′. The component of the cross-magnetizing magnetomotive force in line with the set of poles 9—9′ is, however, more than counterbalanced by the magnetomotive force of the series winding 18. Therefore, it will be seen that the machine will develop a large torque when acting as a motor to crank the engine.

When the engine begins to operate the speed of the armature 3 increases and the machine acts as a generator to supply current to the power and lighting circuit 21 and to the battery 15. The voltage developed between the brushes 5 and 7 is impressed upon the power and lighting circuit 21 through conductors 16 and 22, and the voltage developed between the brushes 5 and 6 which is equal to the voltage developed between the brushes 5 and 7 plus the voltage developed between the brushes 6 and 7 is impressed upon the battery 15 through conductors 16 and 17.

The engine is preferably provided with governing means of any suitable type whereby the speed thereof remains substantially constant.

As soon as the machine 2 begins to operate as a generator current flows through the series winding 27 of the automatic switch 24 so that it acts accumulatively with the shunt winding 25. Therefore, the starting switch 26 which is held closed until the engine starts may be released and the automatic switch 24 will remain in its closed position as long as the current through the coil 27 exceeds a predetermined value. The shunt coil 25 is so designed that the ampere turns thereof exceed the ampere turns of the coil 27 while the battery is supplying current to the machine 2 to operate it as a motor, thereby keeping the switch 24 closed during this operation. When the starting switch 26 is released, the short circuit around the series field winding 19 is opened so that the current supplied to the battery flows through it.

In order to give the battery a suitable taper charge, the field winding 18 is provided in series with the battery circuit and is arranged to produce in the set of poles 9—9′ a magnetomotive force in opposition to the magnetomotive force of the exciting winding 11 and the component AE of the cross-magnetizing magnetomotive force AR. This winding is so arranged that the magnetomotive force thereof more than compensates for the component AE of the cross-magnetizing magnetomotive force AR, due to the current in the armature winding. Therefore, with this arrangement, at the beginning of the charge when the current input into the battery is large, the voltage developed by the flux in the set of poles 9—9′ is a minimum and therefore the voltage delivered between brushes 5 and 6 is also a minimum. As the battery becomes charged and the charging current decreases, the voltage developed by the flux in the set of poles 9—9′ increases and therefore the voltage impressed across the terminals of the battery increases.

In order to maintain the voltage impressed upon the power and lighting circuit substantially constant irrespective of the load connected thereto, I provide the series winding 23 on the set of poles 8—8' which acts accumulatively with the exciting winding 10. The magnetomotive force of this winding is of such a magnitude that, with the machine running at a substantially constant speed, the voltage generated thereby in the armature winding between brushes 5 and 7 is sufficient to compensate for the resistance drop in the armature winding, brushes 5 and 7, series winding 23, and the power and lighting circuit. I also provide the field winding 19, which is connected in series with the battery, on the set of poles 8—8' in order to compensate for the component AD of the armature cross-magnetizing magnetomotive force AE in line with this set of poles. Therefore, the voltage developed between brushes 5 and 7 which is the voltage impressed upon the power and lighting circuit remains substantially constant irrespective of the load connected to the power and lighting circuit and the amount of charging current supplied to the battery.

In order to compensate for the cross-magnetizing magnetomotive force in line with the set of poles 9—9' due to the current supplied to the power and lighting circuit flowing through the armature winding between the brushes 5 and 7, I connect the power and lighting circuit so that the current supplied thereto flows through the series field winding 18 on the set of poles 9—9'.

As the charge of the battery 15 increases, the current through the series winding 27 of the switch 24 decreases until a point is reached where the spring 29 overpowers the magnetic pull of the winding 27. Switch 24 thereupon opens and disconnects the positive brush 5 from the battery 15 and the power and lighting circuit 21. The switch 24 also opens the circuit of the ignition coil 28 to stop the engine 1 and connects the power and lighting circuit 21 directly across the battery 15, thereby restoring the apparatus to its idle condition.

In the arrangement shown in Fig. 2, which is a modification of Fig. 1, I connect the series field winding 23 in series with the conductor 16 instead of with conductor 22 which is connected directly to the brush 7. By connecting this field winding in this manner I am able to decrease the amount of copper required for the series coil 19. It is necessary, however, to provide suitable means to change the connections of the field winding 23 when the machine is being operated as a motor, as otherwise this field winding will act differentially with the exciting winding 10 when the machine is being operated as a motor and will materially decrease the cranking torque thereof. I have shown the starting switch 26 as being arranged to short circuit this series field winding 23 through contacts 33 when in its closed position.

It is believed that the operation of this modification will be obvious from the description of Fig. 1 and therefore a detail description thereof is deemed unnecessary.

It is apparent that while I have shown and described several modifications of my invention, various other modifications and changes may be made without departing from the spirit of my invention, and therefore I desire to cover in the appended claims all such modifications and variations which fall within the true spirit and scope of my invention.

What I claim as new and desire to secure by Letters Patent of the United States, is:—

1. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for the set of poles last mentioned, a translation circuit connected to be supplied at the voltage induced by said last mentioned set of poles, a second translation circuit connected to said 180 degree brushes, an exciting winding for the other set of poles, the machine being constructed and arranged so that the cross-magnetizing magnetomotive force due to the load current in said second translation circuit produces in the set of poles inducing the voltage supplied to said first mentioned translation circuit a magnetomotive force in opposition to the magnetomotive force of the first mentioned exciting winding, and a winding connected in series with said second translation circuit and arranged to produce in said last mentioned set of poles a magnetomotive force in opposition to the magnetomotive force produced therein by the cross-magnetization.

2. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for the set of poles last mentioned, a translation circuit connected to be supplied at the voltage induced by said last mentioned set of poles, a winding connected in series with said translation circuit and arranged to produce in the set of poles last mentioned a magnetomotive force in the same direction as magnetomotive force produced therein by said exciting winding, a second translation circuit connected to said 180 degree brushes, an exciting winding for the other set of poles, the machine being constructed and arranged so that the cross-magnetizing magnetomotive force due to the current in said second translation circuit produces in the set of poles inducing the voltage supplied to said first mentioned translation circuit a magnetomotive force in opposition to the magnetomotive force of the first mentioned exciting winding, and a winding connected in series with said second translation circuit and arranged to produce in said last mentioned set of poles a magnetomotive force in opposition to the magnetomotive force produced therein by the cross-magnetization.

3. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles connected to be supplied at the voltage induced by one of said sets of poles only and arranged so that the direction of flux in both sets of poles is such as to cause both sets of poles to induce electromotive forces in the same direction in the armature winding between said 180 degree brushes, a translation circuit connected to be supplied at the same voltage as the exciting windings, a second translation circuit connected to said 180 degree brushes, the machine being constructed and arranged so that the cross-magnetizing magnetomotive force due to the current in said second translation circuit produces in the set of poles inducing the voltage supplied to said first mentioned translation circuit a magnetomotive force in opposition to the magnetomotive force of the exciting winding therefor, and a winding connected in series with said second translation circuit and arranged to produce in said last mentioned set of poles a magnetomotive force in opposition to the magnetomotive force produced therein by the cross-magnetization.

4. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles connected to be supplied at the voltage induced by one of said sets of poles only, and arranged so that the direction of flux in both sets of poles is such as to cause both sets of poles to induce electromotive forces in the same direction in the armature winding between said 180 degree brushes, a translation circuit connected to be supplied at the same voltage as the exciting winding, a second translation circuit including a storage battery connected to said 180 degree brushes, the machine being constructed and arranged so that the cross-magnetizing magnetomotive force due to the current in the armature winding produces in one of said sets of poles a magnetomotive force which is in the same direction as the magnetomotive force of the exciting winding for said set of poles and a magnetomotive force in the other of said sets of poles in opposition to the magnetomotive force of the exciting winding therefor, a winding on said last mentioned set of poles connected in series with said second translation circuit and arranged to produce a magnetomotive force in opposition to the magnetomotive force produced therein by cross-magnetization, and a winding on the other set of poles connected in series with the second mentioned translation circuit and arranged to produce a magnetomotive force in opposition to the magnetomotive force produced therein by cross-magnetization.

5. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles connected to be supplied at the voltage induced by one of said sets of poles only and arranged so that the direction of flux in both sets of poles is such as to cause both sets of poles to induce electromotive forces in the same direction in the armature winding between said 180 degree brushes, a translation circuit connected to be supplied at the same voltage as the exciting windings, a second translation circuit including a storage battery connected to said 180 degree brushes, the machine being constructed and arranged so that the cross-magnetizing magnetomotive force due to the current in the armature winding produces in one of said sets of poles a magnetomotive force which is in the same direction as the magnetomotive force of the exciting winding for said set of poles and a magnetomotive force in the other of said sets of poles in opposition to the magnetomotive force of the exciting winding for said last mentioned set of poles, a winding on said last mentioned set of poles connected in series with said second translation circuit and arranged to produce a magnetomotive force in opposition to the magnetomotive force produced in said last mentioned set of poles by cross-magnetization, a winding on said last mentioned set of poles connected in series with said first mentioned translation circuit and arranged to produce in said set of poles a magnetomotive force in the same direction as the magnetomotive force of the exciting winding therefor, and a winding on the other set of poles connected in series with the second mentioned translation circuit and arranged to produce a magnetomotive force in opposition to the magnetomotive force produced in said last mentioned set of poles by cross-magnetization.

In witness whereof, I have hereunto set my hand this twenty-third day of October, 1920.

ROBERT STECK.